Nov. 25, 1952  C. H. CARLISLE  2,619,186
SEISMIC EXPLORATION METHOD
Filed Jan. 24, 1948

Charles H. Carlisle, INVENTOR.
BY Dwight C. Otis
AGENT.

Patented Nov. 25, 1952

2,619,186

UNITED STATES PATENT OFFICE 2,619,186

SEISMIC EXPLORATION METHOD

Charles Harry Carlisle, Houston, Tex., assignor, by mesne assignments, to Standard Oil Development Company, Elizabeth, N. J., a corporation of Delaware Application January 24, 1948, Serial No. 4,105

3 Claims. (Cl. 181—.5)

The present invention is directed to improvements in a method of seismic exploration of subsurface strata of the earth. More particularly, the invention is directed to improvements in a method of generating seismic waves beneath large bodies of water.

In the art of seismic exploration on land, it is conventional to fire a shot or charge of explosive in a shot hole in the earth. The explosion of the charge produces seismic waves which travel in all directions through the earth. A part of these waves may travel downward through various strata and be reflected from or refracted through certain subsurface strata and then be returned to the surface. It is conventional to arrange vibration detectors, commonly known as seismic pickups or geophones, at known distances from the shot hole and to convert a portion of the seismic energy transmitted through the earth to electrical energy which may be amplified and recorded upon a moving strip of film or paper by means of a suitable oscillograph. In order that useful calculations may be made from the record thus obtained, it is important that the record should be sharp, clear and free from extraneous disturbances.

When applying conventional seismic exploration methods, as used on dry land, to explore beneath extensive bodies of water, such as rivers, lakes, ocean bays and the like, the charge of explosive is generally not placed in a shot hole but is fired beneath the surface of the water and preferably close to the bottom thereof. It has been observed that when the charge of explosive is small or is fired at such depth in the water that the force of the explosion fails to blow out the water above the charge, spurious seismic impulses which are secondary to the primary waves normally produced by the explosion are often generated. These secondary impulses frequently are nearly as strong as the primary seismic waves but occur at a slightly later time than the primary waves. As a result, two or more events may appear upon the seismograph record and may lead to misinterpretation of the record.

It is believed that the secondary impulses produced when a charge of explosive is fired under water are the result of the oscillating expansion, contraction, re-expansion and eventual collapse of the "gas bubble" or cavity formed in the water by the combustion products of the exploding charge. In the prior art, it is known to prevent occurrences of secondary impulses by correlating the amount of explosive charge, the strength of the explosive and the depth at which the explosive is fired so that the explosive force is just sufficient to blow out the water above the exploding charge and thus permit the gas bubble to vent immediately into the air rather than oscillate through stages of expansion, contraction and re-expansion.

Although the method of the prior art may be satisfactory under certain circumstances when exploring in relatively shallow water, it has disadvantages particularly when exploring in relatively deep water. In order to utilize explosive material efficiently, it is desirable that the charge of explosive should be fired on or close to the bottom of the body of water or at least far enough below the surface of the water so that the force of the explosion is insufficient to blow out the water above the exploding charge and thereby confine the force of the explosion below the surface of the water so that as much as possible of the energy of the explosion may be converted into useful seismic waves. If it be known from experience, for example, that a certain size charge of explosive of a given strength is sufficient to produce a desired record, it may be found that this charge is insufficient to blow out the water thereabove when the charge is placed adjacent the bottom in relatively deep water. Therefore, in the practice of the prior art method, an unnecessarily large amount of explosive must be used to blow out the water and prevent generation of secondary seismic impulses. On the other hand, when operating in certain areas where the water may be shallow and where governmental regulations may prohibit the firing of a charge of explosive directly on the bottom of the body of water, it may be found that the amount of charge and strength of explosive necessary to obtain a particular seismograph record is considerably more than enough to blow out the water. Hence, much of the energy of the explosive will be dissipated ineffectively because of insufficient confining medium to direct the force of the explosion in the desired direction.

I have now discovered a novel method for generating primary seismic waves beneath a body of water while preventing the generation of disturbing secondary seismic impulses. Briefly stated, my invention comprises placing a primary charge of explosive below the surface of the water, placing one or more secondary charges of explosive adjacent the primary charge at an effective distance therefrom so that the envelopes of the major gas bubbles formed by exploding the primary and secondary charges will collide, and then simultaneously firing the primary and secondary charges of explosives.

The method of my invention may be better understood from the following description taken in conjunction with the accompanying drawing in which Fig. 1 is a sectional view diagrammatically illustrating the placement of a plurality of charges of explosive below the surface of a body of water;

Figure 1:
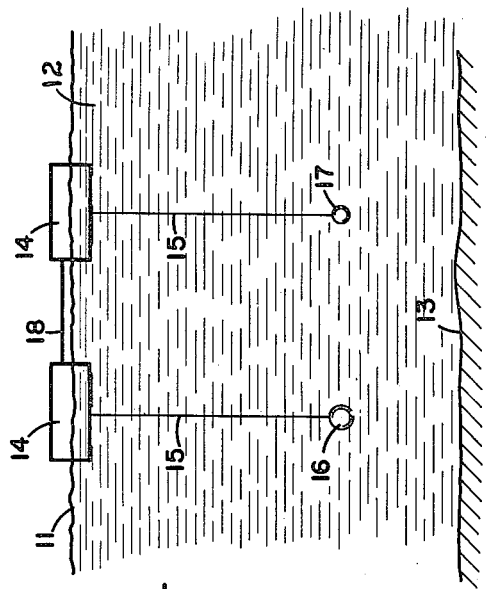

Referring first to Fig. 1 the numeral 11 designates the surface of a body of water 12 having a bottom 13. Upon the surface 11 are arranged two or more floats 14 from which may be suspended by suitable means 15 charges of explosive 16 and 17.

As will be more fully explained hereinafter, charges 16 and 17 may be of equal size or of different sizes. Floats 14 may be of any suitable construction and are preferably held in spaced relation to each other by a rigid or semi-rigid means 18 such as a stiff wire, rod, or plank of wood. Alternatively, spacing means 18 may be arranged adjacent charges 16 and 17 rather than adjacent floats 14. Also, if desired, charges 16 and 17 may be anchored at a desired station by any suitable means (not shown). It will be understood that explosive charges 16 and 17 are also provided with suitable detonators which are arranged to fire the plurality of charges simultaneously from a remote location.

Figure 2:
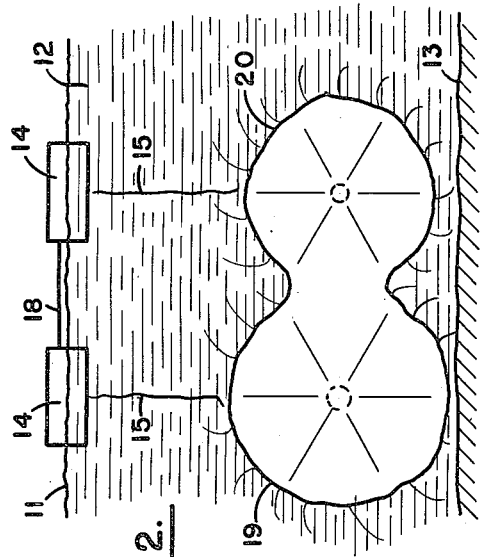
Fig. 2 is a sectional view diagrammatically illustrating the major gas bubbles formed around the location of the explosive charges immediately after the latter have been fired.

Turning now to Fig. 2, it will be seen that the elements described in connection with Fig. 1 are similarly numbered and that the numeral 19 designates the major gas bubble or water cavity formed immediately following the detonation of explosive charge 16 while numeral 20 designates the major gas bubble formed immediately following the detonation of explosive charge 17. In accordance with my invention, explosive charges 16 and 17 are arranged below the surface of the water and preferably on or close to the bottom but spaced from one another at such a distance that the normally spherical gas bubbles 19 and 20 will collide and form a non-spherical cavity in the water. I have found that whenever the paths of two moving spherical bubbles intersect before the maximum radius of each of these two bubbles has been achieved, the secondary energy normally available from these two sources is dissipated by their mutual intersection and tends to eliminate the secondary seismic impulses created when the walls of the bubbles collapse.

Athough in Figs. 1 and 2, only two charges of explosive arranged in a substantially horizontal pattern are illustrated, it will be understood that any reasonable number of charges may be arranged adjacent each other and in any desired vertical or horizontal pattern so long as the charges are spaced in a manner such that the major gas bubbles created by the simultaneous detonation of the charges will break into each other and tend to form other than a spherical cavity in the water.

In practicing seismic exploration, it is common practice to determine, either from experience or as a result of experimentation, the quantity and strength of explosive needed to produce a desired seismic record in a given locality. In accordance with my invention, I may employ the determined amount of explosive and divide it into a primary charge, and one or more secondary charges. Usually the primary charge will be larger than any of the secondary charges and will preferably constitute a major portion of the determined amount. Hence, each secondary charge will be smaller than the primary charge and will constitute a minor portion of the determined amount. Alternatively, I may employ the entire determined amount of explosive as the primary charge and may supplement the primary charge with one or more small secondary charges which are employed primarily to distort and break up the major gas bubble formed as a result of the explosion of the primary charge. It will be apparent that the distance between the charges in order to overcome the undesired effect of collapse of a spherical gas bubble will depend upon the mass and strength of each of the charges and this distance is preferably determined by experiment. In general it will be found that large charges will be separated more than small charges since the maximum radii of the major bubbles formed by the large charges will be greater and the chances of forming pulsating bubbles will decrease as the distance between centers increases. When shooting any size charge, if the two explosive materials are detonated too close to each other the two bubbles formed will add together to form one bubble and this bubble will oscillate. However, if the two charges are detonated at sufficient distance from each other, the bubbles will erupt into each other after the radius of each bubble has had time to develop so that instead of the two bubbles forming one large bubble, the two bubbles will develop up to a certain point individually and then as they develop beyond what might be termed their "critical radii," they will each erupt into the other in such a manner that their forces will tend to cancel and prevent oscillation. However, the two or more charges must not be separated by too great a distance since the radii of the larger bubbles might not then intersect; thus, there would be no interference between the envelopes of the bubbles.

Figure 3:
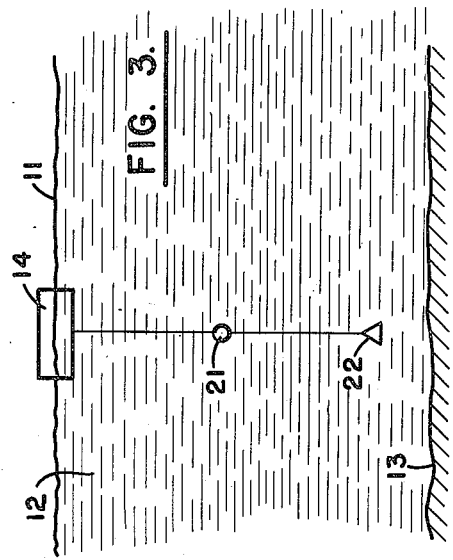
Fig. 3 is a sectional view of another embodiment of my invention wherein at least one shaped charge of explosive is employed.

Referring now to Fig. 3, it will be seen that a plurality of charges 21 and 22 are arranged in a vertical pattern suspended from a single float 14. Explosive charge 22 has been drawn in the form of a triangle to represent, in diagrammatic form, a "shaped" charge of explosive designed to concentrate the force of the explosion in a particular direction. By suitable choice of the specific charge and arrangement in the suspension, charge 22 may be caused to produce a tear-drop-like cavity in the water which will readily penetrate and destroy the spherical gas bubble normally formed by an ordinary charge of explosive. The resulting tear-drop-like pattern is diagrammatically represented by the numeral 23 in Fig. 4. It will be apparent that the tear-drop-like bubble, when formed within an effective distance of the normally spherical bubble 24 produced as a result of the explosion of charge 21, will distort the latter bubble and thereby dissipate the secondary energy therein.

Figure 4:
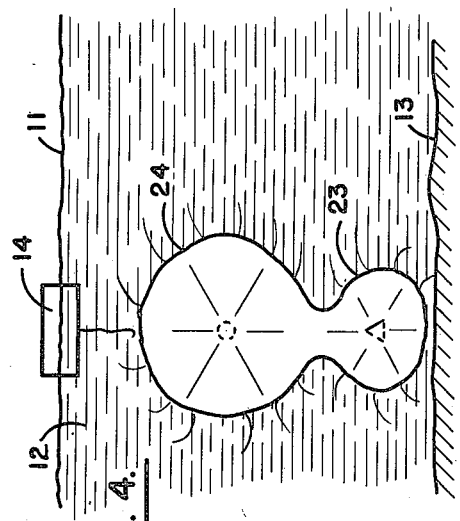
Fig. 4 is a diagrammatical representation of the major gas bubbles formed as a result of firing the charges shown in Fig. 3.

Although in the drawing of Figs. 3 and 4, a shaped charge has been illustrated as spaced below a non-shaped charge in a vertical pattern, it will be apparent that the shaped charge may be placed above the non-shaped charge or that the shaped charge may be arranged in a horizontal pattern with respect to a non-shaped charge so long as the charges are spaced from each other an effective distance not in excess of that at which the cavities formed in the water by the exploding charges will break into and mutually distort each other.

Having fully described and illustrated my invention, what I claim as new and novel is:

1. In a method for seismic prospecting wherein a charge of explosive is fired below the surface of a body of water, the method of preventing generation of secondary seismic impulses while generating primary seismic waves which comprises placing a plurality of spaced charges of explosive below the surface of the water in a susbtantially horizontal pattern at a depth such that the explosive forces of said charges when fired are insufficient to blow out the water above the exploding charges, spacing said charges at effective distances from each other such that the envelopes of major gas bubbles formed by exploding adjacent charges will break into each other, and simultaneously firing said plurality of charges.

2. In a method for seismic exploration wherein an explosive is fired below the surface of a body of water, the method of preventing generation of secondary seismic impulses while generating primary seismic waves which comprises dividing a predetermined quantity of explosive into a major portion and at least one minor portion, placing said major and minor portions in a substantially horizontal pattern below the surface of the water, spacing said portions at an effective distance from each other such that the cavities formed in the water by exploding said major and minor portions will break into each other, and simultaneously firing said major and minor portions.

3. In a method for seismic exploration wherein an explosive is fired below the surface of a body of water, the method of preventing generation of secondary seismic impulses while generating primary seismic waves which comprises placing a primary charge and at least one secondary charge of explosive in a substantially horizontal pattern beneath the surface of the water, spacing said secondary charge from said primary charge at an effective distance such that the cavities formed in the water by exploding said primary and secondary charges will mutually distort each other, and simultaneously firing said primary and secondary charges.

CHARLES HARRY CARLISLE.

REFERENCES CITED

The following references are of record in the file of this patent:

UNITED STATES PATENTS

| Number | Name | Date |
| --- | --- | --- |
| 1,309,391 | Adkins | July 8, 1919 |
| 2,064,451 | Voorhees | Dec. 15, 1936 |
| 2,351,524 | Lay | June 13, 1944 |

FOREIGN PATENTS

| Number | Country | Date |
| --- | --- | --- |
| 701,747 | France | Mar. 21, 1931 |